United States Patent [19]

Izaguirre

[11] Patent Number: 5,305,779

[45] Date of Patent: Apr. 26, 1994

[54] METHOD, SYSTEM, AND APPARATUS FOR OPERATING LARGE POWER GENERATING STATIONS WITH IMPROVED ENVIRONMENTAL PROTECTION MEASURES

[76] Inventor: Albert L. Izaguirre, 12064 W. Jody Dr., Boise, Id. 83704

[21] Appl. No.: 948,457

[22] Filed: Sep. 21, 1992

Related U.S. Application Data

[63] Continuation of Ser. No. 742,030, Aug. 8, 1991, abandoned.

[51] Int. Cl.⁵ .................................. G05D 9/12
[52] U.S. Cl. .................................. 137/172; 137/192; 137/392; 417/40
[58] Field of Search ............... 137/172, 192, 392; 417/40

[56] References Cited

U.S. PATENT DOCUMENTS

| | | | |
|---|---|---|---|
| 2,051,180 | 8/1936 | Ruzicka | 137/187 X |
| 2,411,749 | 11/1946 | Oberly et al. | 137/172 X |
| 2,573,172 | 10/1951 | Ennis et al. | 137/187 X |
| 3,279,001 | 10/1966 | Lenz | 137/392 X |
| 3,279,380 | 10/1966 | Clark | 137/172 X |
| 3,419,034 | 12/1968 | Hart | 137/172 |
| 4,596,266 | 6/1986 | Kinghorn et al. | 137/392 X |
| 4,974,626 | 12/1990 | Koch | 137/192 X |

*Primary Examiner*—Gerald A. Michalsky
*Attorney, Agent, or Firm*—Frank J. Dykas; Craig M. Korfanta; Ken J. Pederson

[57] ABSTRACT

A system for containing oil in a containment tank received from a transformer bank for a hydroelectric power generating station. A capacitance proximity sensor is mounted at a predetermined height within the tank and is operative to sense the passage of an oil/water interface in close proximity to the sensor to generate an output control signal for controlling a solenoid operated valve for the tank to close the valve and prevent spillage of oil into the environment. Collected water can be drained from the tank to a point where the oil/water interface has been reduced to a predetermined height within the tank, thereby leaving adequate remaining oil containing capacity within the tank in the event of further oil discharge from a transformer.

5 Claims, 3 Drawing Sheets

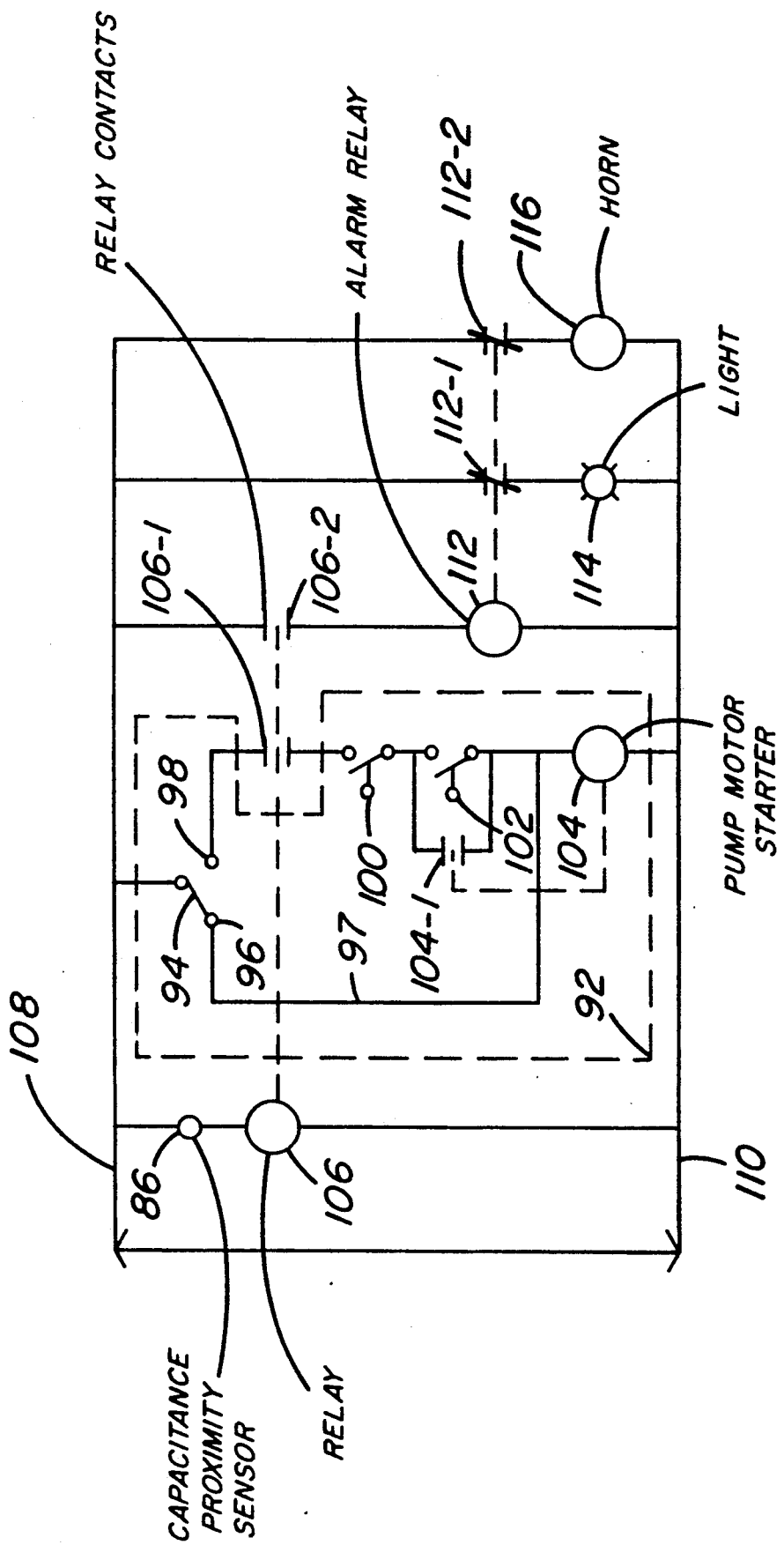

METHOD, SYSTEM, AND APPARATUS FOR OPERATING LARGE POWER GENERATING STATIONS WITH IMPROVED ENVIRONMENTAL PROTECTION MEASURES

This application is a continuation of Ser. No. 07/742,030 filed on Aug. 8, 1991, now abandoned.

TECHNICAL FIELD

This invention relates generally to environmental protection systems for heavy electrical equipment such as hydroelectric generating stations, and more particularly to a fluid control system which is operative to prevent the introduction of oil, petroleum or other similar toxic materials into the water cooling and discharge systems for such equipment.

BACKGROUND ART

In conventional hydroelectric power generating stations, the energy developed by the water passing from the higher elevation of the forebay to the lower elevation of the tail-race turns a turbine which, in turn, is directly connected to a generator. The terminals of the generator or generators are then connected to power transformers which, by virtue of their association with the power plant, are located near the adjacent bodies of water. These transformers are required to "step up" the generated voltage to the levels necessary for transmitting the energy the relatively long distances from the production facilities to the system loads. Typically, these transforms will have a power carrying capability of up to several hundred megawatts, and in order to provide electrical insulations as well as cooling, they will contain several thousand gallons of insulating oil.

Occasionally, failures will occur in these power transformers which can result in a fire, or a loss of some or all of the insulating oil, or both. In order to protect against the uncontrolled release of this oil into the environment, containment basins have been constructed under and around such units. In practice, these basins collect rain and other water which requires occasional draining. In the past, the drains have occasionally either been left open inadvertently, or have failed to close completely due to obstructions, thus providing a path for oil leakage or spillage into the environment.

More recently, insurance companies have issued Safety and Protection Regulations which call for the installation of automatic fire protection systems for these transformers. These systems are designed to respond to a fire or explosion by releasing a fire retarding substance such as water in order to prevent the fire from spreading to adjacent units or to the adjacent structures. Typically, these fire suppression systems might release up to several hundred gallons per minute of water onto such a fire. In the event of such a catastrophe, the existing containments would have to be large enough to contain not only the oil released from the transformer due to the damage of the event, but also the water released by the fire protection system. The existing containment structures are not large enough to accomplish this.

The solution to both of the above problems lies in the means by which these containments are drained. Whereas in the past, the practice was to drain the containments into the river once the operator was satisfied that the contents did not constitute an environmental threat, the preferred solution is to plumb the containment basins into a larger, central containment vessel. Typical hydroelectric generating facilities provide such an option. Such facilities are generally designed and built with a station sump into which various water sources such as generator and bearing cooling water, dam leakage, rainwater and the like, as well as the drainage from the transformer oil containment basins if they were so plumbed, might drain. Assuming that a means existed by which oil could be separated from water satisfactorily, this station sump would be an excellent containment vessel for the above purpose. The big problem to be addressed is that, by necessity, the only means of evacuating the contents of the station sump is to pump the water into the river, but only when there is assurance that the contents being pumped is water, and only water. The additional use of the station sump as a master containment for the various oil spill containment basins does add to the complexity of the sump evacuation system, and it is the solution to this latter problem to which the present invention is directed.

DISCLOSURE OF INVENTION

The general purpose and principal object of the present invention is to provide a new and improved method, system, and apparatus for the containment of the oil and water that might be released in the event of a catastrophic failure and/or fire associated with the station power transformer(s) while simultaneously pumping only the water out of the containment vessel, thereby preventing an environmental problem as a result of the event.

Another object of this invention is to provide a new and improved method, system, and apparatus of the type described wherein the above oil versus water discrimination capability within such a containment vessel can be economically and reliably achieved.

Another object of this invention is to provide a new and improved method, system, and apparatus of the type described wherein the above oil versus water level sensing within the containment vessel can be reliably and easily maintained by an operator using oil and water level sensing redundancy, if desired, for back-up protection.

To accomplish the above purpose and related objects, there is described herein a novel method and system for containing oil and preventing oil spillage from transformers or other similar heavy electrical equipment used in hydroelectric dam construction. This method includes the steps of:

a. passing oil and water into a common containment vessel in the event of a fire or other equipment malfunction to create an oil/water interface therein, b. pumping water out of an exit port or gate of the containment vessel when the oil/water interface therein is above a predetermined level, c. sensing the movement of the oil/water interface past the predetermined level within the containment vessel, and thereby d. shutting off the exit port or gate, whereby no oil is allowed to pass through the exit port or gate for the containment vessel.

A novel feature of this invention is the provision of a method and system of the type described which includes creating an electromagnetic field at the location of the above oil/water interface, and then interrupting the electromagnetic field with the oil/water interface to thereby generate a control signal which may then be amplified to deactivate a relay and in turn close a gate spillway from the containment vessel.

Another novel feature of this invention is the provision of a new and improved method and system of the type described which includes inserting an elongated hollow tube to a predetermined depth within the containment vessel, and then placing a capacitance proximity probe or switch into the lower end of the tube and activating this probe to develop the above electromagnetic field and thereby sense movement of the oil/water interface past a predetermined location within the vessel.

Another novel feature of this invention is the provision of unique electrical circuitry (FIG. 1B) for implementing the oil/water discriminating operation in a transformer containment basin with a water gate spillway.

Another novel feature of this invention is the provision of unique electrical circuitry (FIG. 2B) for implementing the oil/water discrimination operation in a common multi-transformer containment vessel having a sump pump for pumping water and only water therefrom.

The above brief summary of the invention, together with its attendant objects, features, and related advantages will become better understood with reference to the following description of the accompanying drawings.

BRIEF DESCRIPTION OF THE DRAWINGS

FIG. 2B is a schematic circuit diagram for the sensor electronics located within the containment vessel of FIG. 2A.

DETAILED DESCRIPTION OF THE PREFERRED EMBODIMENTS

Figure 1A:
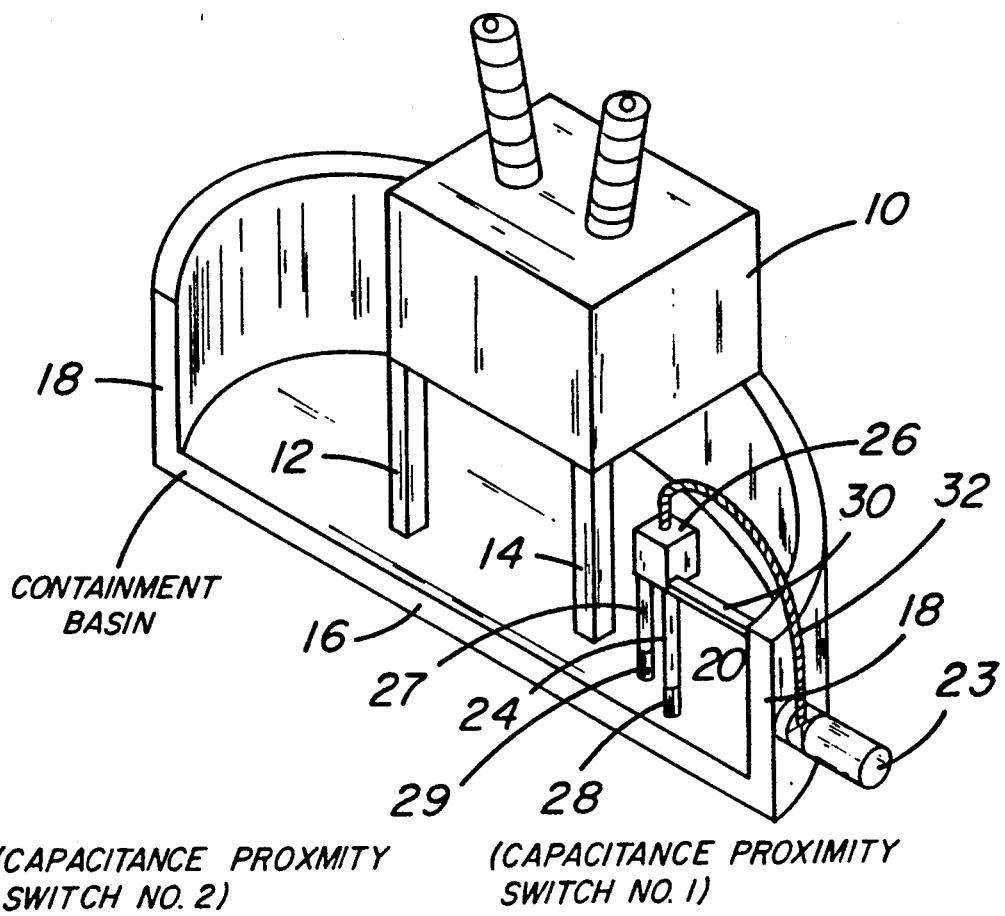
FIG. 1A shows an oil and water containment basin in combination with a power transformer or oil switch, and this containment basin is electronically controlled in accordance with the present invention.

Referring now to FIG. 1A, there is shown a power transformer or other equivalent oil switch 10 which is mounted on a pair of supporting members 12 and 14 in an oil containment basin 16. An encircling upstanding end wall 18 extends vertically as shown from the floor of the oil containment basin 16 and includes a rain water exit drain or port 20 which is operated in combination with an electrical solenoid 22.

A first hollow elongated cylindrical tube 24 is extended as shown from a control box 26 down into the oil containment basin 16 to a distance sufficient to allow water discharge from the basin 16, but still operative to provide oil containment therein. The elongated tube 24 is preferably fabricated of polyvinyl-chloride (PVC) and is sealed on its lower end. The PVC tube 24 is adapted for receiving at its lower end a first capacitance proximity switch 28 which may be lowered by an operator into the end of the PVC pipe 24 using electrical cables (not shown) extending from the switch 28 for connection to the electrical control box 26. A second PVC tube 27 extends from the control box 26 and to a lesser extent into the basin 16, and it contains a second capacitance proximity switch 29 whose operation is described below. Both of these capacitance proximity switches 29 and 28 are wholly contained within the sealed lower ends of the PVC tubes 27 and 29, respectively, and are not in contact with any surrounding liquid.

The control box 26 is located on a horizontal upper support member 30 extending as shown from the upper surface of the upstanding vertical wall 18 of the oil containment basin 16. The electrical control box 26 is in turn connected by way of a flexible conduit 32 to the electrical solenoid 22. The solenoid 22 operates in response to signals received from the capacitance proximity switches 28 and 29 to open and close the solenoid valve 22 for the rain water drain 20 in the following manner of operation.

In the event that the oil and water containment basin 16 becomes filled with water only, the water will energize the capacitance proximity switches or sensors 28 and 29 upon reaching a level a predetermined distance from the ends of the sensors 28 and 29, and thereby cause the upper sensor 29 to generate an output signal of a level sufficient to energize the solenoid 22 and open the solenoid valve for the rain water drain exit port 20 and allow the water to exit the oil containment basin 16. The dielectric constant of water is about 80, and the capacitance proximity switches 28 and 29 operate to establish a magnetic field around the lower end of each sensor. This electromagnetic field is produced within each sensor by applying a voltage to a coil (not shown) therein such that an electromagnetic field is set up around the coil and around the lower ends of the capacitance proximity switches 28 and 29.

When there is no oil or water within the containment basin 16, this electromagnetic field passes through air which has a dielectric constant of approximately one (1) which thus presents a relatively high reluctance to the electromagnetic circuit of the coil and prevents any significant output signal to be generated by the capacitance proximity switches 28 and 29. On the other hand, when water approaches the ends of the capacitance proximity switches 28 and 29 and having a dielectric constant of about 80, this fact greatly reduces the reluctance of the electromagnetic circuit surrounding the coils of each sensor and thus enables the capacitance proximity switches 28 and 29 to generate an output signal into the control box 26 and through the flexible conduit 32 to energize the solenoid 22 and open the solenoid valve at the rain water exit port 22 and allow this water to be removed from the oil containment basin 16.

On the other hand, if for any reason the containment basin 16 does become filled with oil having a dielectric constant of about 2 (or with any other kind of petroleum product with the approximately same dielectric constant), this oil or petroleum product will again greatly increase the reluctance of the magnetic circuit surrounding the output coils of the capacitance proximity switches 28 and 29. This movement in turn causes the output signal of the lower sensor 28 to be reduced to a level insufficient to energize the solenoid 22, thereby leaving the solenoid valve closed for the opening 20 in the containment basin wall 18 to prevent the removal and spillage of oil or other petroleum product from the oil containment basin 16.

The present invention is not limited to the particular type of capacitance proximity sensors 28 and 29 of the type used in either of the two preferred embodiments described herein and may be one of many different types of commercially available proximity sensors which have electronics contained therein capable of discriminating between materials with different dielectric constants. When the electromagnetic field at an output antenna or coil of a chosen proximity sensor sets up in an annular pattern around the output end of the sensor 28, it passes through the adjacent liquid where high dielectric constant liquids such as water present the magnetic circuit of the coil with a low reluctance to thereby enable a solenoid-triggering output signal to be generated from the sensor. Conversely, low dielectric constant materials such as oil or other liquid petroleum products present the magnetic circuit of the coil with a high reluctance to thereby greatly reduce the output magnetic flux and correspondingly signal of the proximity sensor to a level insufficient to activate the electrical solenoid 22. One such sensor having a variable gain and suitable for use as the capacitance proximity switch 28 is disclosed in U.S. Pat. No. 4,613,830 issued to Kamiya et al, assigned to Omron Tateisi Electronics Company of Japan and incorporated herein by reference. Other similar types of capacitance proximity sensors or switches are disclosed, for example, in U.S. Pat. No. 4,426,293 issued to Mason et al, U.S. Pat. No. 4,845,486 issued to Knight et al, and U.S. Pat. No. 4,259,975 issued to Kinsey, Jr. et al, all incorporated herein by reference.

Figure 1B:
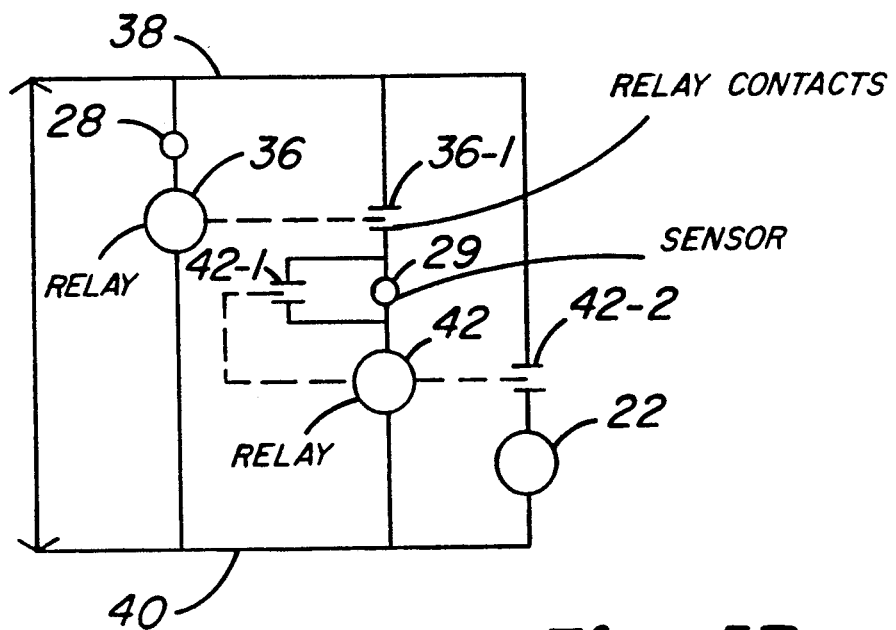
FIG. 1B is a schematic circuit diagram for the proximity sensor and associated electrical solenoid shown in FIG. 1A.

Referring now to FIG. 1B, there is shown a schematic circuit diagram of the electrical circuit in which the lower sensor 28 and the start sensor 29 in FIG. 1A operate in a cooperative manner to control the water discharge solenoid 22 and cause the water discharge solenoid 22 to pass water through the output water flow pipe 23 in case of water overflow, but to prevent the operation of the water discharge solenoid 22 in the event of oil spillage into the containment basin 16. As shown in FIG. 1B, the lower sensor 28 is connected to a lower sensor relay 36 and across 120 AC lines 38 and 40. The low sensor relay 36 is mechanically linked as indicated to the lower sensor relay contacts 36-1 which are in turn connected to one side of the start sensor 29. The start sensor 29 is in turn connected as shown to the start sensor relay 42, and start sensor relay contacts 42-1 are connected as shown in parallel with the start sensor 29. The start sensor relay 42 is also mechanically linked in turn to the start relay sensor contacts 42-2 which are operative upon closure to connect the water discharge solenoid 22 across the AC line 38 and 40.

In the event that the containment basin 16 starts to fill up with water only, the lower sensor 28 will become energized when the water level reaches in close proximity thereto to in turn energize the relay 36 which then closes the relay contacts 36-1. This operation sets the stage for the subsequent energization of the start sensor 29 as the event the water level continues to rise and reach a certain proximity from the surface of the start sensor 29. The start sensor 29 will then in turn allow current to flow through the start sensor relay 42 which then closes the relay contacts 42-1 and 42-2 to energize the solenoid 22 and allow water to exit the output exit pipe 23. Subsequently, as the water level begins to fall, and with the condition that the relay contacts 42-1 remain closed, the solenoid 22 will maintain the water exit port through pipe 23 open until such time that the water level drops to a predetermined level below the lower sensor 28 to thereby cause the relay 36 to deactivate the relay contacts 36-1 and thereby deactivate the solenoid 22.

However, in the event that oil instead of water moves through contact with either of the lower or start sensors 28 and 29, respectively, these sensors will not respond to the presence of oil and will thereby maintain the solenoid 22 deactivated to thereby prevent any flow of oil through the output pipe 32.

Figure 2A:
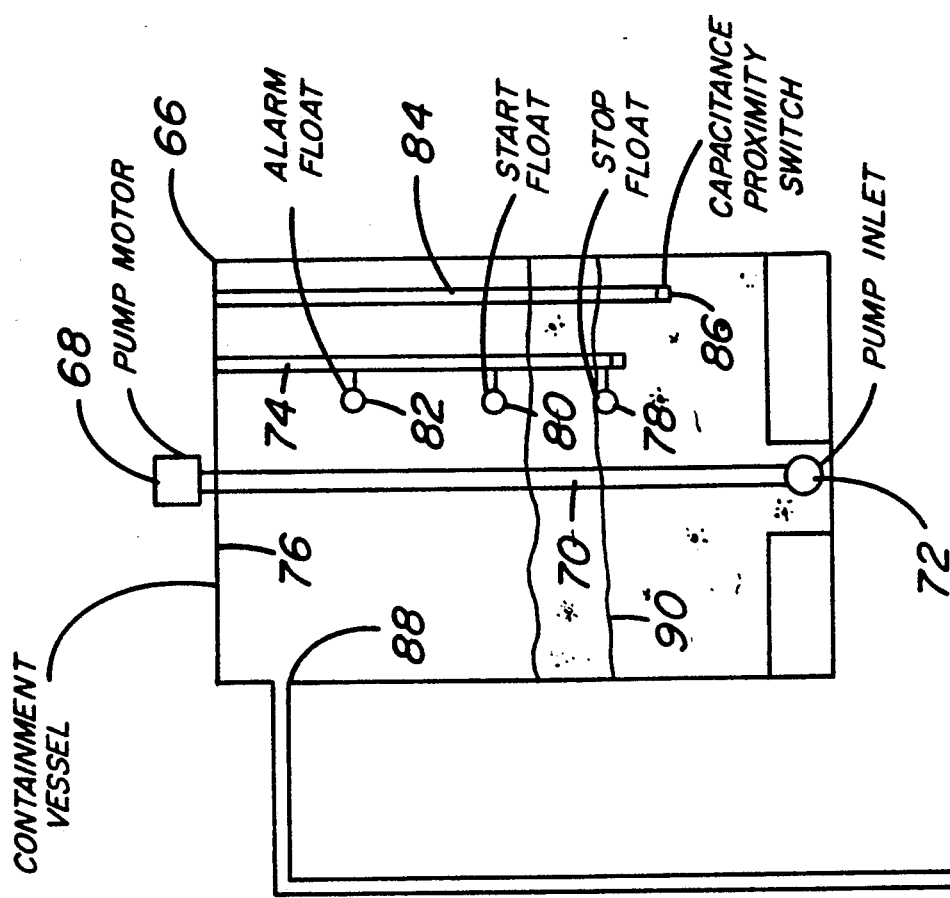
FIG. 2A is a system level functional fluid flow diagram of the hydroelectric water pumping system operative in accordance with the teachings of the present invention.
Figure 2A:
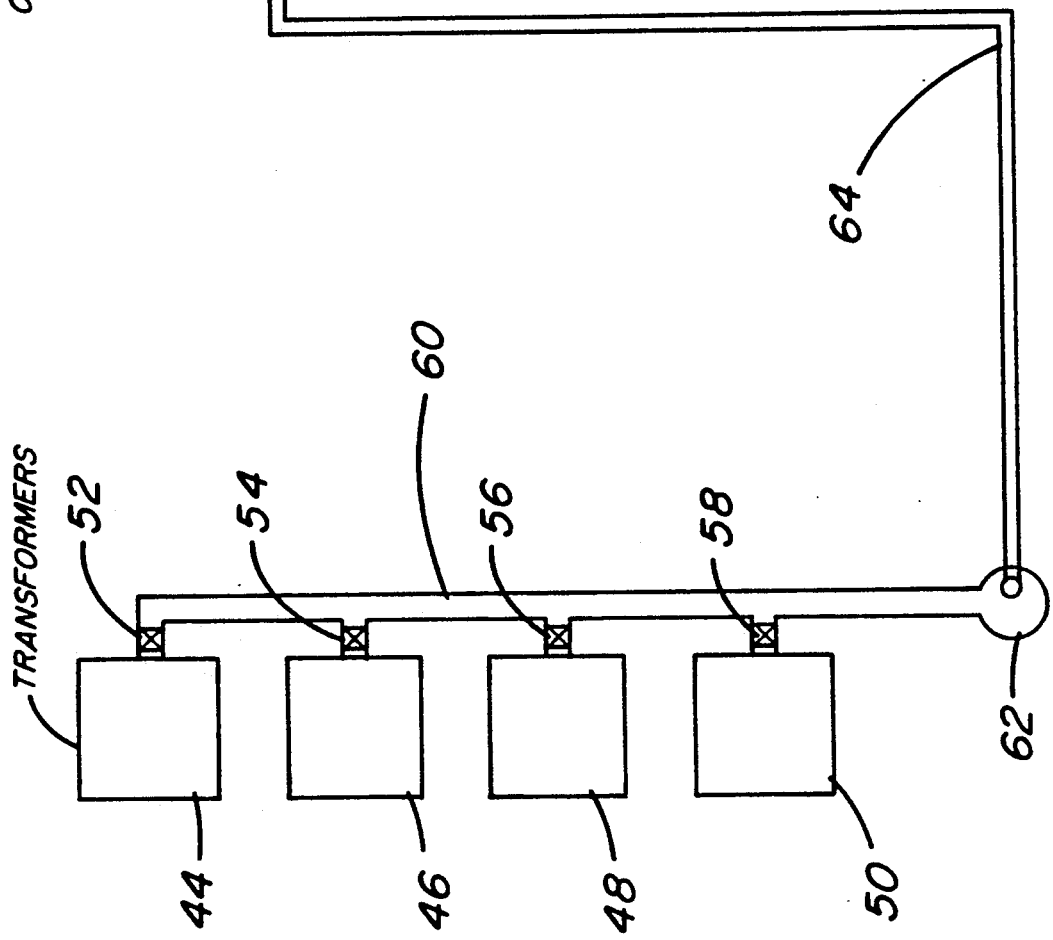

Referring now to FIG. 2A, the functional system level fluid flow diagram shown in this figure includes an oil containment and water pumping system for four (4) large transformers and associated basins 44, 46, 48, and 50. These transformers and basins may be of the type shown in FIG. 1A, and each of the transformer basins 44, 46, 48, and 50 are typically connected, respectively, through solenoid valves 52, 54, 56, and 58 to a common header conduit or pipe 60. The common header pipe 60 is in turn connected into a holding tank 62 containing pumps or may be piped directly if gravity feed is possible. The holding tank 62 is connected by way of a station sump line 64 into the main containment vessel 66 of the system. In the present embodiment, this system is useful in a hydroelectric power station located within a hydroelectric dam. Each of the large transformer basins 44, 46, 48, and 50 will normally be mounted in close proximity of water hydroelectric dam, and each of the transformers within these transformer basins 44, 46, 48, and 50 will typically have a capacity of a 100 megavolt amperes (MVA) or 100 megawatts and each contain about 15,000 gallons of cooling oil. Each of the 100 megawatt transformers will also include therein a water generating fire suppression system typically capable of supplying 900 gallons of water per minute on any fire originating in these transformers.

The oil and water containment vessel 66 includes a station sump pump motor 68 connected by way of a hydraulic line 70 to a sump pump input port 72, and a first elongated rod 74 is extended as shown from a top wall 76 of the containment vessel 66 to a predetermined depth into the containment vessel 66. The first elongated rod 74 includes an "off" float 78, an "on" float 80 and an "alarm" float 82. In normal operation, the station sump pump motor 68 will be turned off when water in the containment vessel 66 falls below the level of the "off" float 78, whereas the station sump pump motor 68 will be turned on when the water level in the containment vessel 66 rises above the level of the "on" float 80. Upon reaching the level of the "alarm" float 82, the "alarm" float 82 will signal an alarm condition to an operator that water levels in the containment vessel are exceedingly high and should be attended to.

The containment vessel 66 will typically have a capacity of 100,000 gallons and, when properly pumped to remove water as described below, is more than an adequate liquid containment capacity for the four (4) 15,000 oil gallons for the four (4) transformers and basins 44, 46, 48, and 50 together with their 900 gallons of water per minute fire suppression systems.

Under worst case conditions, these four transformers would all be operating to empty oil and water into the header line 60 and into the holding tank 62. The holding tank 62 is typically a tank having DC and AC pumps which are mounted on the tail race deck of the dam and are used to pump a combination of oil and water from the header line 60 and via pipe 64 into the main containment vessel 66.

A second, elongated hollow pipe 84 is preferably a 1½ inch diameter sealed polyvinylchloride (PVC) material which is extended as shown adjacent to the first elongated pipe or rod 74 and to a vertical distance into the containment vessel 66 of typically 60 to 75 feet. A capacitance proximity switch 86 is lowered down through the center of the PVC pipe 84, and the proximity sensor 86 will typically be positioned about two inches below the stop float of the first elongated rod 74. In this manner, the electrical system in FIG. 2A will allow water to be pumped out of the containment vessel 66 until such time that the oil/water interface 90 moves to about one quarter (¼) to one-half (½) inch below the lower surface of the proximity switch 86.

During a water and oil containment operation, the combination of water and oil flowing into the containment vessel 66 from the upper entry port 88 therein will tend to separate rather quickly, and establish the above described oil/water interface 90 with the oil floating on the water in the containment vessel 66 and moving vertically downward in the containment vessel 66 as the water is pumped out of the station sump pump input port 72. In this manner, oil is properly contained within the containment vessel 66, while simultaneously allowing the water overflow to be continuously pumped out of the containment vessel 66 until such time that the oil/water interface 90 has moved downwardly in the direction of the arrow shown in FIG. 2A to a level slightly beneath the bottom surface of the capacitance proximity switch 86.

At this time, the oil now passes through the magnetic field set up by a coil (not shown) in the capacitance proximity switch 86 to thereby greatly increase the reluctance of the magnetic circuit of the coil, thereby correspondingly decreasing the magnetic flux lines around the coil and flux-dependent output signal thereof to de-energize the station sump pump 68 and prevent any oil from being pumped out of the containment vessel 66. On the other hand, in the event more water is pumped into the containment vessel 66 to thereby again raise the level of the oil/water interface 90 above the capacity proximity sensor 86, then the water with a higher dielectric constant of 80 being in the flux path around the output coil of the sensor 86 will thereby again reduce the reluctance of the magnetic circuit of the coil, thereby increasing the flux lines thereof and simultaneously increasing the output signal of the capacitance proximity switch 86 to again turn on the station sump pump 68 and again begin pumping water out of the containment vessel 66.

Referring now to FIG. 2B, there is shown a schematic electrical diagram corresponding to the electrical circuitry within the containment vessel 66 in FIG. 2A. The circuitry within the dashed line area 92 in FIG. 2B represents the circuitry of existing electrical systems of the type used within the container 66 for existing or prior art water flow control systems. This circuitry within the dashed line area in FIG. 2B includes a manual switch 94 connected to switch between the hand and automatic positions 96 and 98, and this circuitry further includes a stop float 100 and a start float 102 which, as will be seen below, correspond, respectively, to the lower sensor 28 and start sensor 29 in the schematic circuitry in FIG. 1B. The start float 102 is serially connected to a pump motor starter 104 which is in turn electrically coupled to the relay contacts 104-1 connected in parallel with the start float 102. The switch 94 may be used to manually energize the pump motor starter 104 via terminal 96 and line 97, or set to the automatic terminal 98 for purposes of the present description.

The circuitry in FIG. 2B added by way of the present invention includes the oil sensor 86 which is serially connected to the oil sensor relay 106 across the AC line 108 and 110. The oil sensor relay 106 is electrically coupled as shown to the newly added oil sensor relay contacts 106-1 and to second oil sensor relay contact 106-2. The second oil sensor relay contacts 106-2 are serially connected to an alarm relay 112 across the AC line 108 and 110 as shown.

The alarm relay 112 is then in turn electrically coupled to a first set of alarm relay contacts 112-1 and to a second set of alarm relay contacts 112-2. The alarm relay contacts 112-1 are serially connected to a red indicating light 114, and a horn relay 116 is connected in series with the second alarm relay contacts 112-2.

The circuitry in FIG. 2B will operate in the following manner in response to first a condition where there is only water present in the containment basin 66 in FIG. 2A and then in a discriminating manner in response to oil being fed through the input port 88 of the containment basin 66.

Under normal operating conditions, the sensor 86 in FIG. 2B is submerged in the water and the stop float 100 will deactivate the pump motor starter 104, thereby shutting off the pump 68 in FIG. 2A before the water in the vessel 66 falls below the level of the capacitance proximity sensor 86. With the sensor 86 energized by the water surrounding it, the sensor 86 keeps the relay 106 energized which mechanically closes contacts 106-1 to thereby allow normal pump operation through the operation of the stop float 100 and the start float 102 which, respectively, turn the pump motor starter 104 off and on in a normal manner. During this time, the alarm relay 112 mechanically keeps contacts 112-1 and 112-2 open thereby deactivating the red light 114 and the horn 116.

However, in the event that oil reaches close proximity to the oil sensor 86, the sensor 86 will become deactivated to in turn deactivate the relay 106, thereby causing the relay 106 to mechanically open contacts 106-1 and interrupt the circuit to the motor starter 104. This switching action in turn will turn off the pump 68 in FIG. 2A and simultaneously the relay 106 will open the contacts 106-2 which will now deactivate the alarm relay 112. This latter switching action in turn will operate to mechanically close contacts 112-1 and 112-2 to thereby turn on the red light 114 and activate the horn 116 to alert an operator of the presence of an oil interface in the containment vessel 66 or of some other system failure.

Various modifications may be made in and to the above described embodiments without departing from the spirit and scope of this invention. For example, the present invention is operative with many different types of oil-containing heavy electrical equipment other than high voltage transformers. For example, the present invention may be used with heavy duty oil circuit breakers operated between high voltage transformers and AC transmission line voltage for electrically interconnecting and disconnecting these transformers to high voltage power lines.

Similarly, turbine thrust and guide bearings used for the AC voltage generators in power stations will also typically carry up to 1,000 gallons of oil or greater, and these large quantities of oil must be periodically drained in order to service the turbines. The oil from these turbine thrust and guide bearings is normally drained into large bladders, but if for some reason there is a failure or breakage of these bladders, then the sump pump and containment vessel system shown in FIG. 2A would ensure that no oil is spilled into the surrounding environment.

Similarly, the governor systems used for supplying the hydraulic fluid for operating the turbines may also typically be in excess of 1,000 gallons of hydraulic fluid and operated at pressures between 200 and 1200 pounds per square inch (psi), and the oil containment system shown in FIG. 2A would also be operative for containing this hydraulic fluid in the case of leakage from the governor system for operating the turbines.

The present invention is also operative gas turbines having diesel capacities in excess of 1,000,000 gallons of fuel. Thus, the spillage of diesel from these large capacity turbines could likewise be discriminated against by use of capacitance proximity switches of the type shown at 86 in FIG. 2A to distinguish between this petroleum product and water in a manner similar to that described above with respect to the oil discrimination process.

Finally, it should also be understood that the present invention is not limited to the use with only water from transformer fire suppression systems and instead may be used with a wide variety of water sources such as turbine cooling water, bearing cooling water, dam leakage, power house floor drains and the like. Accordingly, method and system modifications designed to accommodate these variations in oil and water equipments and sources are clearly within the scope of the following appended claims.

I claim:

1. A system for containing oil and preventing oil spillage in the event of malfunctioning of certain heavy electrical equipment including, in combination:
    a. means for passing oil and water into a common tank in the event of a malfunction to create an oil/water interface,
    b. means for pumping water out of an exit port of said tank when said oil/water interface is above a predetermined level,
    c. means within said tank or vessel for sensing the movement of said oil/water interface past said predetermined level within said tank or vessel, said sensing means including a closed hollow tube disposed within said tank or vessel to a predetermined level therein, a capacitance proximity probe disposed in one end of said tube and operative to create an electromagnetic field through which said oil/water interface may pass and thereby change the reluctance of said electromagnetic field, said capacitance proximity switch being operative to discriminate between the near proximity of water on the one hand and the near proximity of petroleum products on the other hand to in turn generate an output signal of a level sufficient to operate said pumping means when in predetermined close proximity to water having a dielectric constant on the order of about 80 but insufficient to operate said pumping means when in predetermined close proximity to petroleum product having a dielectric constant on the order of about 2, and
    d. means for shutting off said pumping means when said oil/water interface drops a certain distance from said capacitance proximity switch, whereby oil spillage from said common tank is prevented.

2. The system defined in claim 1 wherein said capacitance proximity switch is connected in series with a relay between AC line voltage terminals, and relay contact and drive means are connected to said relay, and a pump motor is connected to said relay contact and driver means for pumping water out of said tank until said oil/water interface drops a predetermined distance below said capacitance proximity switch.

3. The system defined in claim 2, wherein said relay contact and driver means includes:
    a. a first relay contact coupled to said relay,
    b. stop float and a start float connected in series with said first relay contact, and
    c. a second relay connected in series between said stop float and start float and across said AC line voltage terminals and operative as a pump motor starter to turn on a water pump for said containment vessel when only water is present therein and shut off said pump motor when oil comes within a predetermined proximity to said capacitance proximity switch.

4. The system defined in claim 3 which further includes:
    a. a second relay contact connected to one AC line voltage terminal, and
    b. a third relay connected between said second relay contact and the other AC line voltage terminal, whereby said second relay contact is mechanically linked to said first relay contact and is operative to energize said third relay to sound an alarm in the event oil levels reach close proximity to said capacitance proximity switch.

5. The system defined in claim 4 which further includes:
    a. a fourth relay and an alarm indicating light connected across said AC line voltage terminals, and
    b. a fourth relay contact and a horn relay connected in series across said AC line voltage terminals, whereby said third and fourth relays are electrically driven by said alarm relay to energize said light and sound and alarm annunciator in response to oil levels approaching said capacitance proximity switch.

* * * * *